No. 863,990. PATENTED AUG. 20, 1907.
S. E. HARTMANN.
FAN ATTACHMENT FOR SEWING MACHINES.
APPLICATION FILED MAR. 26, 1907.
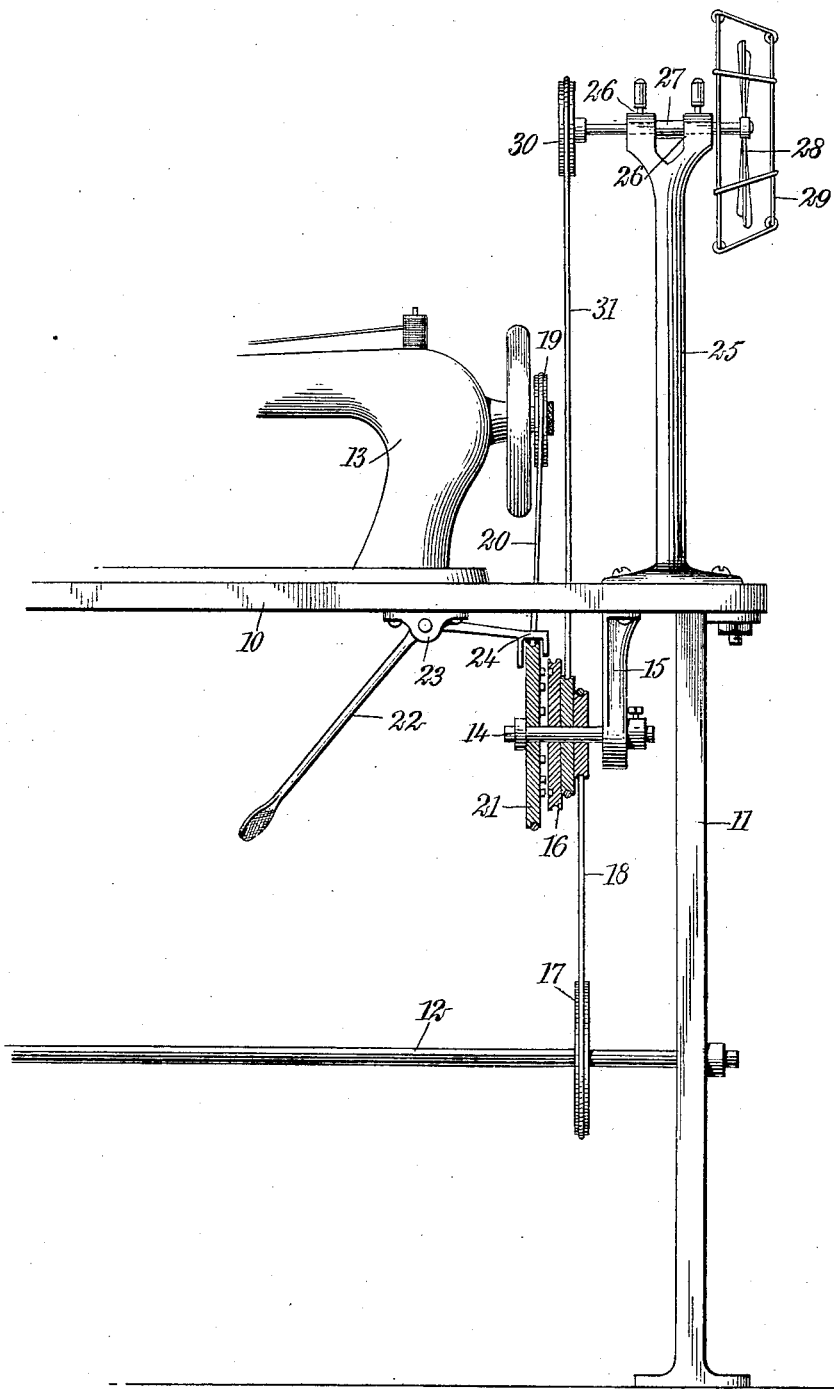
WITNESSES
INVENTOR
Samuel E. Hartmann
BY
ATTORNEYS

UNITED STATES PATENT OFFICE.

SAMUEL E. HARTMANN, OF NEW YORK, N. Y.

FAN ATTACHMENT FOR SEWING-MACHINES.

No. 863,990.　　　Specification of Letters Patent.　　　Patented Aug. 20, 1907.

Application filed March 26, 1907. Serial No. 364,607.

*To all whom it may concern:*

Be it known that I, SAMUEL E. HARTMANN, a citizen of the United States, and a resident of the city of New York, (Bay Ridge, borough of Brooklyn,) in the county of Kings and State of New York, have invented a new and Improved Fan Attachment for Sewing-Machines, of which the following is a full, clear, and exact description.

This invention relates to certain improvements in sewing machines, and more particularly to an improved fan attachment for use in connection with power-operated machines, whereby the fan may be continuously operated directly from the power shaft independent of the machine proper.

The invention consists in certain features of construction and combination of parts, all of which will be fully set forth hereinafter and particularly pointed out in the claims.

Reference is to be had to the accompanying drawings forming a part of this specification, and in which the figure is a side elevation of a machine embodying my invention.

My improved fan attachment is adapted for use in connection with any form of power-operated sewing machine having a continuously rotating shaft and any form of clutch mechanism, whereby the sewing machine proper may be readily connected or disconnected from said shaft.

To illustrate one form of my invention I have shown a sewing machine having a suitable table or platform 10 supported by any suitable form of standard 11, and having a shaft 12 adapted to be continuously rotated by an electric motor or connections to any prime mover.

Mounted upon the table or platform 10 is the frame 13 of the machine proper, and for operating the machine from the drive shaft 12, I provide a counter-shaft 14 mounted in a bracket 15 beneath the machine and provided with means whereby power is transmitted to it from the drive shaft 12. This means preferably comprises a cone pulley 16 formed of preferably three separate members and arranged in alinement with a pulley 17 on the shaft 12, the two pulleys being connected together by a suitable belt or rope 18.

The machine proper is provided with a pulley 19 connected by a belt or rope 20 extending through the table 10 to a pulley 21 mounted on the counter-shaft 14 and adapted to be operatively connected to the cone pulley 16. Any suitable mechanism may be provided for causing the pulley 21 to rotate with the pulley 16, and this mechanism is preferably adapted to be controlled by the knee or the foot of the operator. For purposes of illustration I have shown the pulley 21 provided with a plurality of lugs adapted to enter recesses in the face of the cone pulley 16, the pulley 21 being slidably mounted upon the counter-shaft 14. For moving the shaft I may provide a bell crank lever 22 pivotally supported in a bracket 23 on the under side of the table and having a yoke 24 inclosing the edge of the wheel. By moving the end of the bell crank lever 22 in one direction, the pulley 21 is moved laterally to engage with and be rotated by the pulley 16, while by moving it in the opposite direction the pulley 21 is disengaged by the pulley 16 and may remain idle.

Supported upon the table or standard 10 of the machine, I provide a suitable standard 25 having bearings 26 at its upper end and within which is mounted a short shaft 27. Upon one end of the shaft I provide a fan 28 protected and inclosed by a suitable wire cage 29, and the opposite end of the shaft is provided with means whereby the shaft may be rotated. In order that the shaft may rotate continuously and irrespective of the starting or stopping of the machine proper, I provide the shaft 27 with a pulley 30 directly above the cone pulley 16 of the counter-shaft 24, and operatively connected thereto by a suitable belt or rope 31. By so supporting and operatively connecting the fan, it will be noted that the fan is rotated continuously so long as power is applied to the machine, and that the starting or stopping of the machine proper by the operating of the lever 22 does not in any way affect the fan.

It is known to be old to operatively connect a rotary fan to a sewing machine, but in all prior devices the fan is so connected to the machine that it is stopped or started with the stopping or starting of the machine proper. In power-operated sewing machines, it is customary to provide pulleys, 16 and 17, whereby the speed of the machine in respect to the drive shaft may be varied, and in my improved construction I avoid the necessity for providing an additional pulley or additional shaft by connecting the drive belt 31 of the fan directly to the cone pulley 16. Thus, it will be noted that my improved fan attachment may be connected to any machine of the character specified without necessitating any changes in the construction or normal operation thereof. All that is necessary is to secure the standard 25 in the proper position and provide openings in the table or platform 10, whereby the belt 31 may be connected to the cone pulley 16. If it is desired to change the speed of the machine by changing the belt 18 to different members of the cone pulley 16 and 17, the belt 31 may be shifted to a different member than that to which it is illustrated as being connected, the belt being so constructed as to be readily lengthened or shortened.

Having thus described my invention, I claim as new and desire to secure by Letters Patent:

1. In combination, a sewing machine mechanism, a standard mounted adjacent thereto and independent of said mechanism, a rotary fan journaled in said standard, a cone transmission pulley, means for rotating said pulley, independent belts connecting said pulley to the sewing machine mechanism and to the rotary fan, and means for disconnecting said sewing machine mechanism without interfering with the operation of said fan.

2. In combination, a continuously operated counter-shaft, a cone pulley upon said countershaft, a separate pulley upon the counter-shaft, a sewing machine, means operatively connecting said sewing machine to said last mentioned pulley, means for operatively connecting said last mentioned pulley to the cone pulley of the counter-shaft, a standard mounted adjacent said sewing machine, a horizontal shaft mounted in said standard, a rotary fan carried by said shaft, a pulley mounted upon said shaft, and a belt connecting said last mentioned pulley to the cone pulley of the counter-shaft.

In testimony whereof I have signed my name to this specification in the presence of two subscribing witnesses.

SAMUEL E. HARTMANN.

Witnesses:
JOHN P. DAVIS,
CLAIR W. FAIRBANK.